United States Patent
Tian et al.

(10) Patent No.: US 12,275,905 B2
(45) Date of Patent: Apr. 15, 2025

(54) Y-SHAPED ENTRAINED-FLOW HIGH-TEMPERATURE ZONED GASIFICATION DEVICE ADOPTING DRY-PROCESS SLAG-DISCHARGING

(71) Applicant: China University of Petroleum (East China), Qingdao (CN)

(72) Inventors: Yuanyu Tian, Qingdao (CN); Yingyun Qiao, Qingdao (CN); Kechang Xie, Qingdao (CN); Jingxian Wang, Qingdao (CN); Jinhong Zhang, Qingdao (CN); Jiancheng Wang, Qingdao (CN); Yiliang Tian, Qingdao (CN); Yanpeng Zhang, Qingdao (CN); Ruotong Cui, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 18/769,929

(22) Filed: Jul. 11, 2024

(65) Prior Publication Data
US 2025/0092324 A1  Mar. 20, 2025

(30) Foreign Application Priority Data
Sep. 19, 2023  (CN) .......................... 202311212528.0

(51) Int. Cl.
*C10J 3/48*  (2006.01)
*C10J 3/82*  (2006.01)
*C10J 3/86*  (2006.01)

(52) U.S. Cl.
CPC .................. *C10J 3/485* (2013.01); *C10J 3/82* (2013.01); *C10J 3/86* (2013.01); *C10J 2200/09* (2013.01);
(Continued)

(58) Field of Classification Search
CPC ..... C10J 3/485; C10J 3/76; C10J 3/845; C10J 2200/152; C10J 3/466; C10J 3/506; C10J 3/74; C10J 3/78
See application file for complete search history.

(56) References Cited

U.S. PATENT DOCUMENTS

| 4,049,570 A * | 9/1977 | Gernhardt | C10J 3/57 252/373 |
| 2011/0023362 A1* | 2/2011 | Kirchhubel | C10K 1/101 48/201 |

(Continued)

FOREIGN PATENT DOCUMENTS

| CN | 101724470 A | 6/2010 |
| CN | 102994160 A | 3/2013 |

Primary Examiner — Imran Akram
(74) Attorney, Agent, or Firm — Volpe Koenig

(57) ABSTRACT

The present disclosure discloses a Y-shaped entrained-flow high-temperature zoned gasification device adopting dry-process slag-discharging, which comprises a Y-shaped entrained-flow gasifier, wherein the Y-shaped entrained-flow gasifier is partitioned by a sectioned conical head into an upper gasification chamber and a lower chilling chamber; a descending bed atomizing chiller is arranged in the chilling chamber, a conical top of the descending bed atomizing chiller is in communication with an outlet of the sectioned conical head, and two or more chilling atomizing nozzles are evenly arranged on the conical top of the descending bed atomizing chiller in a circumferential direction.

5 Claims, 1 Drawing Sheet

(52) U.S. Cl.
CPC .... *C10J 2200/152* (2013.01); *C10J 2300/093* (2013.01)

(56) References Cited

U.S. PATENT DOCUMENTS

| | | | | |
|---|---|---|---|---|
| 2012/0110906 | A1* | 5/2012 | Kuske | C10J 3/845 48/87 |
| 2014/0069525 | A1* | 3/2014 | Fischer | G05D 9/00 137/386 |
| 2015/0059246 | A1* | 3/2015 | Fischer | C10K 1/101 48/128 |
| 2015/0090938 | A1* | 4/2015 | Meyer | C10J 3/74 422/600 |
| 2015/0218471 | A1* | 8/2015 | Hannemann | C10J 3/485 422/187 |
| 2018/0237708 | A1* | 8/2018 | Hannemann | C10J 3/84 |
| 2019/0225898 | A1* | 7/2019 | Just | C10J 3/485 |
| 2020/0140769 | A1* | 5/2020 | Tian | C10J 3/86 |

\* cited by examiner

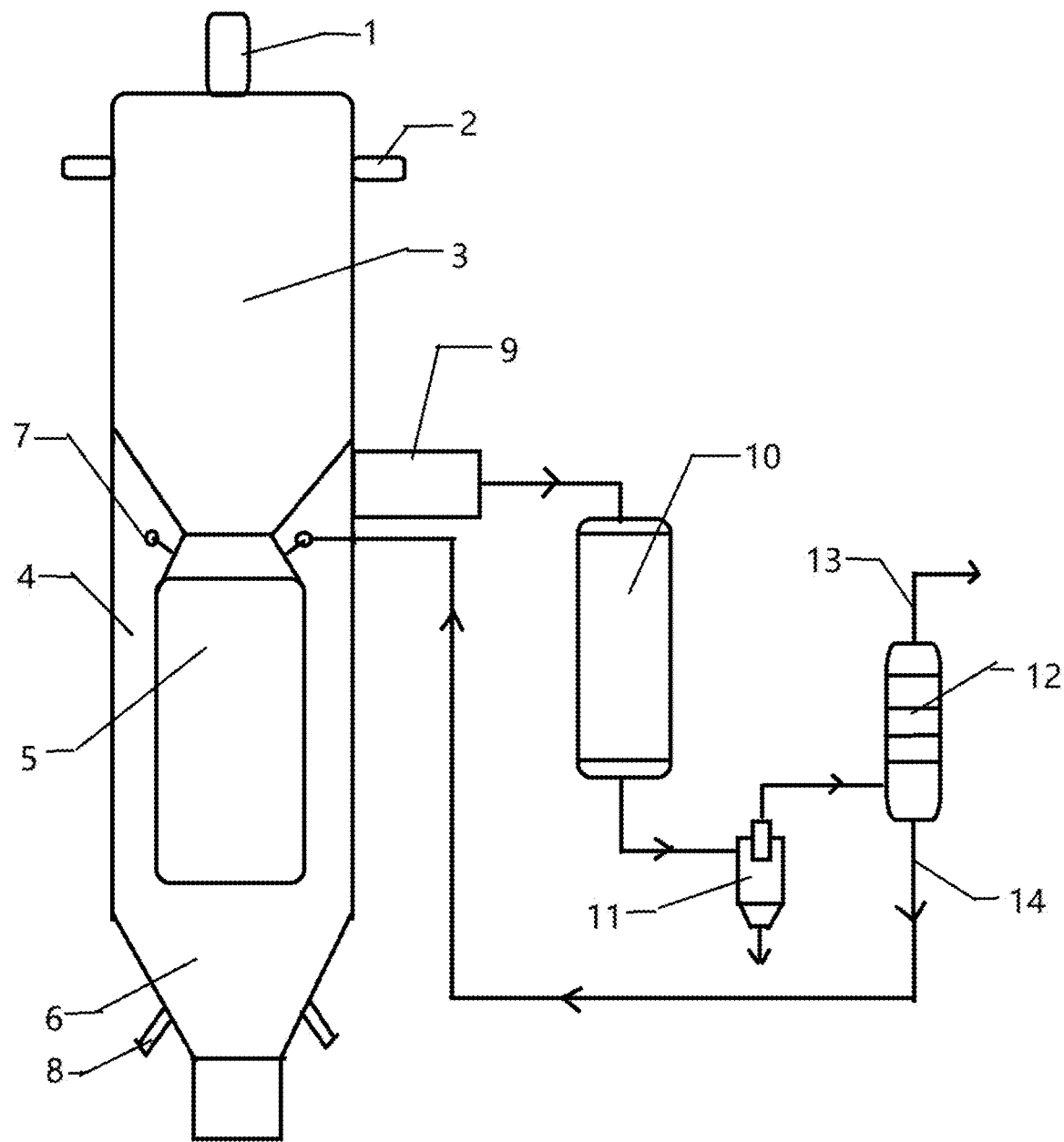

Y-SHAPED ENTRAINED-FLOW HIGH-TEMPERATURE ZONED GASIFICATION DEVICE ADOPTING DRY-PROCESS SLAG-DISCHARGING

CROSS REFERENCE TO RELATED APPLICATION

The present application claims the priority of Chinese Patent Application No. 202311212528.0, filed on Sep. 19, 2023, the entire content of which is incorporated herein by reference.

FIELD

The present disclosure relates to the field of coal chemical industry, in particular to an entrained-flow coal gasification technique.

BACKGROUND

Coal gasification is a leading and key technique for clean and efficient utilization of coal. Entrained-flow gasification is a new high-temperature and high-pressure pulverized coal gasification technique developed in the last decades, in which a gasifier and pulverized coal or coal slurry are injected into a gasification chamber through nozzles, and coal pyrolysis, combustion and gasification reactions are carried out almost simultaneously, the conversion rate of the coal is effectively improved at a high temperature, and the minerals in the coal becomes slag and leaves the gasifier. Compared with traditional gasification techniques, the pressurized entrained-flow gasification technique has high gasification temperature, high processing capacity, high effective gas components and high gasification efficiency, and is the development direction of high-pressure coal gasification techniques in the future.

At present, entrained-flow coal gasification processes may be categorized into two types according to the number and arrangement of nozzles, namely, a single-nozzle direct injection type and a multi-nozzle opposing injection type. For example, Texaco coal-water slurry gasification and GSP pulverized coal gasification employ single-nozzle direct injection, and have advantages including simple structure and control and low cost. However, since the pressurized gasification process involves fluid flow under high temperature, high pressure and heterogeneous flow conditions, and associated transfer process and complex chemical reaction process, single-nozzle direct injection can't achieve an ideal atomization effect and has low gasification efficiency; in addition, single-nozzle direct injection has a small adjustment range of processing capacity and small capacity, and can't meet the requirement of large-scale development. Shell and multi-nozzle coal-water slurry process employ a multi-nozzle opposing injection structure, which improves the mass transfer and heat transfer effect of the gasifier, and improves carbon conversion rate, energy consumption and other indicators. However, the Shell multi-nozzle structure increases the complexity of the equipment; especially, it requires a separate interlock control system, which causes increased equipment cost, increased operation difficulties and increased maintenance rate; the refractory materials at the top of the gasifier may be ablated easily in the coal-water slurry multi-nozzle opposing gasification process owing to the distribution of the flame field, and the service life of the refractory bricks at the top of the gasifier is shortened to several months, causing severely increased investment.

The raw gas from the gasifier has a high temperature (1,200-1,700° C.), and may be cooled in order to make the entrained molten ash solidify and recover heat energy. At present, there are two ways to transfer heat in the industry: one way is an ascending waste boiler process, in which high-pressure steam is generated; the other way is a descending water chilling process, in which a saturated crude gas is produced. The ascending waste boiler process has high thermal efficiency and high calorific value of gas, and is suitable for subsequent IGCC power generation; however, the ascending waste boiler process only recovers a part of the heat of the gas, but doesn't recover the heat of the slag; moreover, it employs an approach of chilling with cold gas and heat recovery with waste boiler for preheating, which involves complex equipment and high energy consumption of cold gas. In the chilling process, the gasifier structure is simple, and the water-containing gas is beneficial to the subsequent conversion procedure; therefore, the chilling process is very suitable for chemical production of synthetic gas; however, in the water chilling process, it is difficult to recover the energy, and the content of effective gas (CO+H2) is low, and the calorific value of gas is low; in addition, in the chilling process, there are large volumes of black water and brine wastewater, which are difficult to treat biochemically. Although the descending waste boiler process can recover the heat of the synthesis gas and slag, it is rarely used in industry at present because of high-temperature corrosion and scaling and clogging.

Chinese Patent Application No. CN101724470A has described a novel coal-water slurry gasifier, which utilizes a top nozzle and side nozzles that jet obliquely upward to form a Y-shaped impact zone at the center of the gasifier, thereby the heat and mass transfer and mixing process is strengthened, the reaction rate is increased, and the carbon conversion rate is improved; owing to the function of the top nozzle, the retention time of coal water slurry in the Y-shaped impact zone is prolonged and the flames are in a downward direction, so that the flames at a temperature up to 2,000° C. will not impact the refractory materials at the top of the gasifier; besides, the inner wall temperature of the refractory material layer is lower than the solidification temperature of the liquid slag under the cooling effect of the water (vapor) cooled wall tube; thus, a solidified slag layer is formed on the surface of the refractory material layer, and plays a role of wear resistance and protection for the refractory material layer, thereby the service life of the gasifier is greatly prolonged; however, since the slag is discharged in a liquid state, the energy is not recovered, and there are large volumes of black water and saline wastewater, which are difficult to treat biochemically.

Chinese Patent Application No. CN102994160A has described an entrained-flow gasifier adopting solid-phase slag-discharging, which utilizes a top nozzle and side nozzles to form a Y-shaped impact zone, thereby the retention time of coal water slurry in the high-temperature reaction zone is prolonged, the heat and mass transfer and mixing process is strengthened, the impact of high temperature on the refractory materials at the top of the furnace is avoided, the carbon conversion rate is improved, the range of applicable coal types and the adjustment range of processing capacity are extended, and potential safety hazards and a defect of shortened service life of the hearth protection layer caused by startup detonation of a gasifier with a single top nozzle are eliminated; a water cooled wall structure composed of a heat-insulating material layer, a cooling tube and wear-resistant material layer assembled from outside to inside is utilized to realize wear resistance by means of a deposited slag layer, thereby protect the cooling tube, and prolong the service life of the gasifier; the circulating cooling gas jetted from a rotary cyclone cooling jacket is used to strengthen the cooling and solidification of the slag, and realize separation of ash and slag by centrifugal rotation; thus, the problem of black water generation in the water chilling process is solved, the waste heat of ash, slag and synthesis gas is recovered at the same time, the structure of the cooling chamber is simplified, and the demanding requirement and cost of the heat-insulating and wear-resistant materials are reduced. In actual applications, the gasifier has performance much superior to the performance of other synthetic entrained-flow gasifiers, but it still has some severe defects and shortcomings, for example, it is difficult for the slag to adhere to the water-cooled wall; large pieces of slag may be produced; saline wastewater that is difficult to treat is inevitably produced owing to the water seal for the hot slag and will affect long-term safe operation; the circulating gas cooling effect is poor; the energy consumption is high; great investment is required; the centrifugal effect of the synthesis gas driven by the cyclone cooling gas is weak; the large volume of gas causes severely increased load of the waste heat boiler; the cooling spiral pipe structure is not conducive to the arrangement of the side nozzles, the structure is complex, and there is a high requirement for the material of the pressure-bearing housing, etc. Consequently, the promotion and application of the entrained-flow gasifier adopting solid-phase slag-discharging are limited. Therefore, it is one of the urgent tasks in the coal chemical industry to develop a large-size entrained-flow gasifier that has high capacity, high efficiency, a high regulation level, a high heat recovery rate, low investment and long-term operation ability.

SUMMARY

To overcome the above-mentioned severe defects and shortcomings of existing entrained-flow gasifiers adopting solid-phase slag-discharging in the prior art, the present disclosure provides a Y-shaped entrained-flow high-temperature zoned gasification device adopting dry-process slag-discharging, which has advantages including simple structure, long service life, wide adaptability of coal types, long retention time for coke and slag reaction, low ash-slag ratio, high carbon conversion rate, easy slag adhesion to the water-cooled wall, wear resistance by means of a deposited slag layer, and large adjustment range of processing capacity; the slag is atomized and chilled, and then is fluidized and discharged through a dry process, so that the brine wastewater is eliminated while a cooling effect is achieved through heat exchange, the ash and slag are separated, and the structure is simple and ensures smooth slag discharging; the ash-containing synthesis gas is utilized to reduce the heat transfer boundary layer on the inner wall of the fire-tube waste boiler, thereby a convection heat transfer effect is enhanced, and the heat exchange area and equipment investment are reduced; the black water in the carbon scrubber is recycled, thereby off-site black water discharge from gasification is eliminated, and the requirement of the industrial sectors for large-size clean and efficient synthetic gasifiers is met.

The present scheme provides a Y-shaped entrained-flow high-temperature zoned gasification device adopting dry-process slag-discharging, which comprises a Y-shaped entrained-flow gasifier, wherein the Y-shaped entrained-flow gasifier is partitioned by a sectioned conical head into an upper gasification chamber and a lower chilling chamber; a descending bed atomizing chiller is arranged in the chilling chamber, a conical top of the descending bed atomizing chiller is in communication with an outlet of the sectioned conical head, and two or more chilling atomizing nozzles are evenly arranged on the conical top of the descending bed atomizing chiller in a circumferential direction.

A main nozzle is arranged at the top of the gasification chamber, three or more side nozzles are arranged evenly on an upper side wall of the gasification chamber in the circumferential direction, an included angle between the side nozzle and a horizontal direction is −15°-15°, an included angle between the side nozzle and a radial direction is 2°-35°, and the side nozzles can form swirls in the gasification chamber.

An upper part of the chilling chamber is connected with a raw synthesis gas outlet pipe, the raw synthesis gas outlet pipe is connected to an inlet of a fire-tube convection waste boiler, an outlet of the fire-tube convection waste boiler is connected to an inlet of a gas-solid separator, an outlet of the gas-solid separator is connected to an inlet of a carbon scrubber, a top outlet of the carbon scrubber is connected with a synthesis gas discharge pipe, a bottom outlet of the carbon scrubber is connected with a black water discharge pipe, and the black water discharge pipe is connected to the chilling atomizing nozzles.

A conical fluidized bed heat exchange slag discharger is arranged at the bottom of the chilling chamber and connected with a fluidized gas nozzle.

The cross-sectional area of the descending bed atomizing chiller is 40%-80% of the cross-sectional area of the chilling chamber, and the height of the descending bed atomizing chiller is 50%-80% of the height of the chilling chamber; a heat exchange tube of an inlet section of the fire-tube convection waste boiler extends out of a heat exchange end plate by 30-200 mm; a height-diameter ratio of the chilling chamber is 2-8:1, a distance between the raw synthesis gas outlet pipe and the top of the chilling chamber is 100-1,000 mm, a distance between the descending bed atomizing chiller at the center and the conical fluidized bed heat exchange slag discharger at the bottom is 300-1,500 mm, and a cone angle of the conical fluidized bed heat exchange slag discharger is 30°-80°.

A height-diameter ratio of the gasification chamber is 2-5:1, the distance from the opening of the side nozzle to the top of the gasification chamber is 500-2,500 mm, and a ratio of the raw material handling capacity of the top nozzle to the raw material handling capacity of the side nozzle is 1-4:1.

A fluidized gas used by the fluidized gas nozzle is water vapor or synthetic gas.

The fire-tube convection waste boiler is provided with one to three stages of waste heat recovery.

BRIEF DESCRIPTION OF THE DRAWINGS

FIG. 1 is a schematic structural diagram of the Y-shaped entrained-flow high-temperature zoned gasification device adopting dry-process slag-discharging in the present disclosure.

In the FIGURES: 1—top nozzle, 2—side nozzle, 3—gasification chamber, 4—chilling chamber, 5—descending bed atomizing chiller, 6—fluidized bed heat exchange slag discharger, 7—chilling atomizing nozzle, 8—fluidized gas nozzle, 9—raw synthesis gas outlet pipe, 10—fire-tube convection waste boiler, 11—gas-solid separator, 12—carbon scrubber, 13—synthesis gas discharge pipe, 14—black water discharge pipe.

DETAILED DESCRIPTION

The present disclosure will be detailed below with reference to the accompanying drawings. As shown in FIG. 1, the Y-shaped entrained-flow high-temperature zoned gasification device adopting dry-process slag-discharging in the present disclosure mainly consists of a Y-shaped entrained-flow gasifier, a descending bed atomizing chiller 5, a fluidized bed heat exchange slag discharger 6, a fire-tube convection waste boiler 10, a gas-solid separator 11, a carbon scrubber 12, etc. The Y-shaped entrained-flow gasifier is partitioned into a gasification chamber 3 and a chilling chamber 4 by a sectioned conical head arranged at the middle part; a main nozzle 1 is arranged at the top of the gasification chamber 3, three or more side nozzles 2 for assisting in swirling are arranged evenly on an upper side wall of the gasification chamber 3 in a circumferential direction, and an outlet of the sectioned conical head at the bottom of the gasification chamber 3 is in communication with the descending bed atomizing chiller 5 of the chilling chamber 4; the descending bed atomizing chiller 5 is arranged at the center of the chilling chamber 4, the conical top of the descending bed atomizing chiller 5 is connected in a sealed manner with the sectioned conical head at the bottom of the gasification chamber 3, the cross-sectional area of the descending bed atomizing chiller 5 is 40%-80% of the cross-sectional area of the chilling chamber 4, the height of the descending bed atomizing chiller 5 is 50%-80% of the height of the chilling chamber 4, and two or more chilling atomizing nozzles 7 are evenly arranged on the conical top of the descending bed atomizing chiller 5 in the circumferential direction; a raw synthesis gas outlet pipe 9 is arranged on the upper part of the chilling chamber 4 and connected to a wear-resistant fire-tube convection waste boiler 10, a conical fluidized bed heat exchange slag discharger 6 is arranged at the bottom of the chilling chamber 4, and a slag discharger pipe of the conical fluidized bed heat exchange slag discharger 6 is connected with a lock hopper for variable pressure slag discharging; the height-diameter ratio of the chilling chamber 4 is 2-8:1, the height of the raw synthesis gas outlet pipe 9 from the top of the chilling chamber 4 is 100-1,000 mm, the distance between the descending bed atomizing chiller 5 at the center and the conical fluidized bed heat exchange slag discharger 6 at the bottom is 300-1,500 mm, the cone angle of the conical fluidized bed heat exchange slag discharger 6 is 30°-80°, and the bottom of the conical fluidized bed heat exchange slag discharger 6 is connected with a fluidized gas nozzle 8; an outlet of the fire-tube convection waste boiler 10 is connected to a gas-solid separator 11 and a carbon scrubber 12, the fine ash discharged from an ash discharge port of the gas-solid separator 11 is returned to the raw material bin for reuse, the black water at the bottom of the carbon scrubber 12 is returned to the chilling atomizing nozzle 7 through a black water discharge pipe 14 for reuse, and the synthesis gas containing saturated water vapor at the top of the carbon scrubber 12 is delivered to a sulfur-resistant conversion procedure through a synthesis gas discharge pipe 13.

The height-diameter ratio of the gasification chamber 3 is 2-5:1, the distance from the opening of the side nozzle 2 to the top of the gasification chamber 3 is 500-2,500 mm, the ratio of the raw material processing capacity of the top nozzle 1 to the raw material processing capacity of the side nozzle 2 is 1-4:1, the angle between the side nozzle 2 and the horizontal direction is −15°-15°, and the angle between the side nozzle 2 and the radial direction is 2°-35°.

The fluidized gas used by the fluidized gas nozzle 8 is water vapor or synthetic gas.

A heat exchange tube of the inlet section of the fire-tube convection waste boiler 10 extends out of a heat exchange end plate by 30-200 mm, and a slag layer is deposited for wear resistance; the fire-tube convection waste boiler 10 may be provided with one to three stages of waste heat recovery.

In the actual operation, when the Y-shaped entrained-flow high-temperature zoned gasification device adopting dry-process slag-discharging operates, coal water slurry or pulverized coal and a gasifying agent are fed into the gasifier through the top nozzle and the side nozzles, several jet streams impact each other at the center of the gasifier and thereby form a Y-shaped rotating impact zone, ignite each other and are turbulently agitated and mixed to form a high-temperature reaction zone; the retention time of coke and slag in the high-temperature reaction zone is prolonged by more than 20 times, thereby the heat and mass transfer and mixing process is enhanced, the ignition stability is improved, the carbon conversion rate is improved, and the range of applicable coal types and the adjustment range of processing capacity are extended; moreover, slag can adhere to the water-cooled wall easily, so that a solidified slag layer is formed on the surface of the refractory material layer for wear resistance, thereby the service life of the gasifier is improved; besides, owing to the top nozzle, the flames are in a downward direction, and the flame at a temperature up to 2,000° C. will not impact the refractory materials at the top of the gasifier; in addition, the top nozzle has both ignition function and reaction function, thereby the potential safety hazards and the defect of reduced service life of the gasifier protection layer caused by startup detonation of a gasifier with a single top nozzle are eliminated, and the danger and burden of replacement of ignition nozzle and reaction nozzle at a high temperature are eliminated; the synthesis gas at a temperature above 1,300° C. and the molten ash and slag are merged and rotated at a high speed, and are discharged through a gasification product outlet at the center of the sectioned conical head to the downstream descending bed atomizing chiller. Since the gasification product is chilled with atomized water and directly exchanges heat with the fluidized bed before slag discharging, instead of being chilled with water primarily, the requirements for operating conditions and equipment are greatly reduced.

The black water mist jetted at a high speed through the chilling atomizing nozzles on the upper part of the descending bed atomizing chiller is rapidly mixed and exchanges heat with the raw synthesis gas and liquid slag entering the descending bed atomizing chiller, so that a large amount of phase change heat is released as the molten slag solidifies, the temperature of the discharged raw synthesis gas is decreased to about 800° C., the liquid slag becomes solid slag particles, and gas-solid separation is carried out at the outlet on the lower part of the descending bed atomizing chiller; the solid slag particles fall into the conical fluidized bed heat exchange slag discharger, exchanges heat with the fluidized gas so that the temperature of the solid slag particles is decreased to about 200° C., and then the solid slag particles are discharged, thereby common problems of generation of black water that is extremely difficult to treat subsequently, blockage of the subsequent treatment pipeline, serious secondary pollution, and damage of the chilling ring in the downcomer in the case of water chilling of the gas and slag flowing into a descending fluidized-bed boiler in parallel are eliminated; owing to the low inertia of the ash with high carbon residue content, it is carried by the raw synthesis gas that is diverted upward and at about 800° C., mixed with the heated fluidized gas, flows out of the gasifier through an annular space formed by the wall of the chilling chamber and the descending bed atomizing chiller, and enters the wear-resistant fire-tube convection waste boiler, where the waste heat of the gasification product is fully recovered and the gasification product is cooled down to about 200° C. The temperature of the gasification product is decreased to about 800° C. in the chilling chamber, and a dry-type fluidized slag discharging structure is employed for discharging the gasification slag; thus, the structure of the chilling chamber is simplified, and the demanding requirement and cost of the heat-insulating and wear-resistant materials are reduced. In addition, a chilling ring is not required in the slag discharge pipe; thus, the problem that the chilling ring may be damaged easily and the long-term operation is affected in the current water chilling process in which gas and slag flow into the descending fluidized-bed boiler in parallel is avoided.

Fine ash is separated from the ash-containing synthesis gas after heat exchange in the gas-solid separator, and the fine ash at about 200° C. is sent back to the raw material bin for reuse, while the purified synthesis gas flows into the carbon scrubber; the synthesis gas containing saturated steam at the top of the carbon scrubber is sent to a sulfur-tolerant conversion procedure, and the black water at the bottom of the carbon scrubber is returned to the chilling atomizing nozzle; thus, the problem of black water discharge is eliminated, and the carbon black in the black water can be separated by the high-efficiency gas-solid separator and returned to the raw material bin for reuse.

According to the result of an industrial demonstration project of a Y-shaped entrained-flow high-temperature zoned gasification device adopting dry-process slag-discharging, which has 200 tons/day processing capacity, the carbon gasification rate is 99% or above, the water saving rate is 90% or above, the overall heat recovery rate is 85% or above, and the investment is reduced by 30% or more; the carbon content in the gasification slag is lower than 0.1%, which lays a foundation for high-value resource utilization; there is no particular requirement for the volatile matter of the coal, slag can adhere to the water-cooled wall easily and uniformly, and there is no problem of black water and saline wastewater treatment; thus, the requirements of industrial sectors for high-efficiency large-size synthetic gasifiers are met.

The invention claimed is:

1. A Y-shaped entrained-flow high-temperature zoned gasification device adopting dry-process slag-discharging, comprising:
   a Y-shaped entrained-flow gasifier, wherein the Y-shaped entrained-flow gasifier is partitioned by a sectioned conical head into a gasification chamber and a chilling chamber;
   a descending bed atomizing chiller arranged in the chilling chamber;
   a conical top of the descending bed atomizing chiller in communication with an outlet of the sectioned conical head;
   two or more chilling atomizing nozzles are evenly arranged on the conical top of the descending bed atomizing chiller in a circumferential direction;
   a main nozzle is arranged at a top of the gasification chamber;
   three or more side nozzles are arranged evenly on an upper side wall of the gasification chamber in the circumferential direction, wherein a first angle between the side nozzle and a horizontal direction is −15°-15°, a second angle between the side nozzle and a radial direction is 2°-35°, and the side nozzles are configured to form swirls in the gasification chamber; and
   a conical fluidized bed heat exchange slag discharger is arranged at a bottom of the chilling chamber and connected with a plurality of fluidized gas nozzles and a lock hopper, wherein the fluidized gas nozzles are distributed on a lower wall of the discharger and the lock hopper is configured for variable pressure slag discharging;
   wherein:
   an upper part of the chilling chamber connected with a raw synthesis gas outlet pipe,
   the raw synthesis gas outlet pipe is connected to an inlet of a fire-tube convection waste boiler,
   a respective outlet of the fire-tube convection waste boiler is connected to a respective inlet of a gas-solid separator,
   a respective outlet of the gas-solid separator is connected to a respective inlet of a carbon scrubber, a top outlet of the carbon scrubber is connected with a synthesis gas discharge pipe, and
   a bottom outlet of the carbon scrubber is connected with a black water discharge pipe, and the black water discharge pipe is connected to the chilling atomizing nozzles.

2. The Y-shaped entrained-flow high-temperature zoned gasification device of claim 1, wherein:
   a respective cross-sectional area of the descending bed atomizing chiller is 40%-80% of a respective cross-sectional area of the chilling chamber,
   a height of the descending bed atomizing chiller is 50%-80% of the height of the chilling chamber,
   a heat exchange tube of an inlet section of the fire-tube convection waste boiler extends out of a heat exchange end plate by 30-200 mm,
   a height-diameter ratio of the chilling chamber is 2-8:1,
   a distance between the raw synthesis gas outlet pipe and a top of the chilling chamber is 100-1,000 mm,
   a distance between the descending bed atomizing chiller at a center and the conical fluidized bed heat exchange slag discharger at the bottom is 300-1,500 mm, and
   a cone angle of the conical fluidized bed heat exchange slag discharger is 30°-80°.

3. The Y-shaped entrained-flow high-temperature zoned gasification device of claim 2, wherein:
   a height-diameter ratio of the gasification chamber is 2-5:1,
   the distance from an opening of the side nozzle to the top of the gasification chamber is 500-2,500 mm, and a ratio of a respective raw material handling capacity of the top nozzle to a respective raw material handling capacity of the side nozzle is 1-4:1.

4. The Y-shaped entrained-flow high-temperature zoned gasification device of claim 2, wherein a fluidized gas used by the fluidized gas nozzle is water vapor or synthetic gas.

5. The Y-shaped entrained-flow high-temperature zoned gasification device of claim 1, wherein the-fire-tube convection waste boiler includes one to three stages of waste heat recovery.

* * * * *